(12) United States Patent
Kamino et al.

(10) Patent No.: US 10,195,490 B2
(45) Date of Patent: Feb. 5, 2019

(54) GOLF BALL

(71) Applicant: DUNLOP SPORTS CO. LTD., Kobe-shi, Hyogo (JP)

(72) Inventors: Kazuya Kamino, Kobe (JP); Kosuke Tachibana, Kobe (JP); Toshiyuki Tarao, Kobe (JP); Mami Tanaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 3 days.

(21) Appl. No.: 15/343,889

(22) Filed: Nov. 4, 2016

(65) Prior Publication Data

US 2017/0173401 A1 Jun. 22, 2017

(30) Foreign Application Priority Data

Dec. 17, 2015 (JP) ................. 2015-246572

(51) Int. Cl.
 *A63B 37/12* (2006.01)
 *A63B 37/00* (2006.01)
 *C08G 83/00* (2006.01)

(52) U.S. Cl.
 CPC ........ *A63B 37/0076* (2013.01); *A63B 37/004* (2013.01); *A63B 37/006* (2013.01); *A63B 37/0024* (2013.01); *A63B 37/0027* (2013.01); *A63B 37/0037* (2013.01); *A63B 37/0043* (2013.01); *A63B 37/0045* (2013.01); *A63B 37/0062* (2013.01); *A63B 37/0063* (2013.01); *A63B 37/0064* (2013.01); *C08G 83/007* (2013.01)

(58) Field of Classification Search
 None
 See application file for complete search history.

(56) References Cited

U.S. PATENT DOCUMENTS

| | | | | |
|---|---|---|---|---|
| 6,193,920 B1 * | 2/2001 | Moriyama | ............ | B29C 39/10 264/250 |
| 2005/0137030 A1 * | 6/2005 | Sullivan | ............ | A63B 37/0003 473/371 |
| 2012/0052985 A1 | 3/2012 | Shiga et al. | | |
| 2012/0165128 A1 * | 6/2012 | Matsuyama | ....... | A63B 37/0003 473/377 |
| 2012/0214613 A1 * | 8/2012 | Okabe | ................ | A63B 37/0003 473/373 |
| 2013/0053174 A1 * | 2/2013 | Shiga | ................ | C08G 18/4854 473/371 |
| 2013/0324320 A1 * | 12/2013 | Isogawa | ............ | A63B 37/0054 473/373 |
| 2015/0182808 A1 * | 7/2015 | Tachibana | .......... | A63B 37/0092 473/376 |
| 2016/0122605 A1 * | 5/2016 | Hayashi | ............... | C09D 167/04 525/54.3 |
| 2017/0165530 A1 * | 6/2017 | Tachibana | .......... | A63B 37/0096 |
| 2017/0369704 A1 * | 12/2017 | Hayashi | ................. | C08G 18/48 |

FOREIGN PATENT DOCUMENTS

| | | | |
|---|---|---|---|
| JP | 2010-188199 A | | 9/2010 |
| JP | 2013-31778 A | | 2/2013 |
| WO | WO 2005/080469 | * | 9/2005 |
| WO | WO 2016/114243 | * | 7/2016 |

OTHER PUBLICATIONS

Kurahashi, Shape Memory Properties of Polyurethane/ Poly(oxyethylene) Blends; Soft Matter (2012) vol. 8 pp. 496-503. (Year: 2012).*

* cited by examiner

*Primary Examiner* — David J Buttner
(74) *Attorney, Agent, or Firm* — Birch, Stewart, Kolasch & Birch LLP (57) ABSTRACT

A golf ball 2 includes an inner core 4, an outer core 6, a mid layer 8, and a cover 10. A diameter D1, a volume V1, a hardness H1o at a central point, and a boundary inside hardness H1in of the inner core 4; a volume V2, a boundary outside hardness H2out, and a surface hardness H2s of the outer core 6; a thickness Tm and a hardness Hm of the mid layer 8; and a thickness Tc and a hardness Hc of the cover 10 meet the following mathematical formulas (1) to (4): $1.0<V2/V1<7.0$ (1); $-2<H2s-H2out<2$ (2); $600<(H1o+H1in)*(D1/2)/2<1000$ (3); $620<Tc*Hc*Hm/Tm<900$ (4). The cover 10 includes a polyrotaxane.

11 Claims, 1 Drawing Sheet

GOLF BALL

This application claims priority on Patent Application No. 2015-246572 filed in JAPAN on Dec. 17, 2015. The entire contents of this Japanese Patent Application are hereby incorporated by reference.

BACKGROUND OF THE INVENTION

Field of the Invention

The present invention relates to golf balls. Specifically, the present invention relates to golf balls including a core having a two-layer structure, a mid layer, and a cover.

Description of the Related Art

The greatest interest to golf players concerning golf balls is flight distance. In particular, golf players place importance on flight distances upon shots with a driver. There have been various proposals for improvement of flight performance. JP2010-188199 discloses a golf ball including a core having a high hardness at the surface thereof and a low hardness at the central point thereof. JP2013-31778 discloses a golf ball of which the hardness gradually increases from the central point of a core toward the surface of the core.

Golf players also place importance on spin performance of golf balls. When a backspin rate is high, the run is short. By using a golf ball having a high backspin rate, a golf player can cause the golf ball to stop at a target point. When a sidespin rate is high, the golf ball tends to curve. By using a golf ball having a high sidespin rate, a golf player can intentionally cause the golf ball to curve. Golf balls having excellent spin performance have excellent controllability. Advanced golf players place importance particularly on controllability upon shots with a short iron.

In rainy weather, if water is present between a clubface and a golf ball, the golf ball may slip against the clubface. Upon a shot at which a slip occurs, the spin rate is low. This phenomenon is referred to as "flyer". The flyer can occur when lawn is present between a clubface and a golf ball. Upon a shot at which a slip occurs, a golf ball lands on a point that is farther than a point intended by a golf player. Flyer makes it difficult for golf players to predict a landing point. Golf balls with which flyer easily occurs have inferior controllability. Golf players desire golf balls with which flyer is less likely to occur. In other words, golf players desire golf balls having excellent controllability in a wet state. A golf ball having excellent controllability in a wet state is disclosed in JP2012-45223 (US2012/0052985).

Golf players' requirements for golf balls have been escalated. There is room for improvement in various performance characteristics of golf balls.

An object of the present invention is to provide a golf ball having excellent flight performance upon hitting with a driver and having excellent controllability in a wet state.

SUMMARY OF THE INVENTION

A golf ball according to the present invention includes an inner core, an outer core positioned outside the inner core, a mid layer positioned outside the outer core, and a cover positioned outside the mid layer. A diameter D1 (mm), a volume V1 (mm$^3$), a hardness H1o (Shore C) at a central point, and a boundary inside hardness H1in (Shore C) of the inner core; a volume V2 (mm$^3$), a boundary outside hardness H2out (Shore C), and a surface hardness H2s (Shore C) of the outer core; a thickness Tm (mm) and a hardness Hm (Shore D) of the mid layer; and a thickness Tc (mm) and a hardness Hc (Shore D) of the cover meet the following mathematical formulas (1) to (4).

$$1.0 < V2/V1 < 7.0 \quad (1)$$

$$-2 < H2s - H2out < 2 \quad (2)$$

$$600 < (H1o + H1in)*(D1/2)/2 < 1000 \quad (3)$$

$$620 < Tc*Hc*Hm/Tm < 900 \quad (4)$$

A material of the cover is a resin composition. The resin composition includes:

(A) a polyurethane; and
(B) a polyrotaxane having a cyclodextrin, a linear molecule that is threaded through a ring structure of the cyclodextrin, and a blocking group that is located at each of both ends of the linear molecule and prevents detachment of the cyclodextrin, at least a part of hydroxyl groups of the cyclodextrin being modified with a caprolactone chain via a —O—C$_3$H$_6$—O— group.

When the golf ball according to the present invention is hit with a driver, the spin rate is low, and the ball speed is high. Therefore, the golf ball has excellent flight performance upon hitting with a driver. When the golf ball is hit with a short iron in a wet state, the spin rate is high. Therefore, the golf ball has excellent controllability in a wet state. The golf ball has both excellent flight performance and excellent controllability.

Preferably, the hardness Hm of the mid layer is equal to or greater than 55.

A preferable linear molecule is polyethylene glycol. A preferable blocking group is an adamantyl group.

Preferably, an amount of the polyrotaxane (B) in the resin composition of the cover per 100 parts by weight of the polyurethane (A) is equal to or greater than 1 parts by weight but equal to or less than 50 parts by weight.

Preferably, a loss elastic modulus E" of the polyurethane (A) is equal to or less than $5.0*10^7$ Pa. Preferably, a loss elastic modulus E" of the cover is equal to or less than $5.0*10^7$ Pa.

DESCRIPTION OF THE PREFERRED EMBODIMENTS

The following will describe in detail the present invention based on preferred embodiments with appropriate reference to the drawings.

Figure 1:
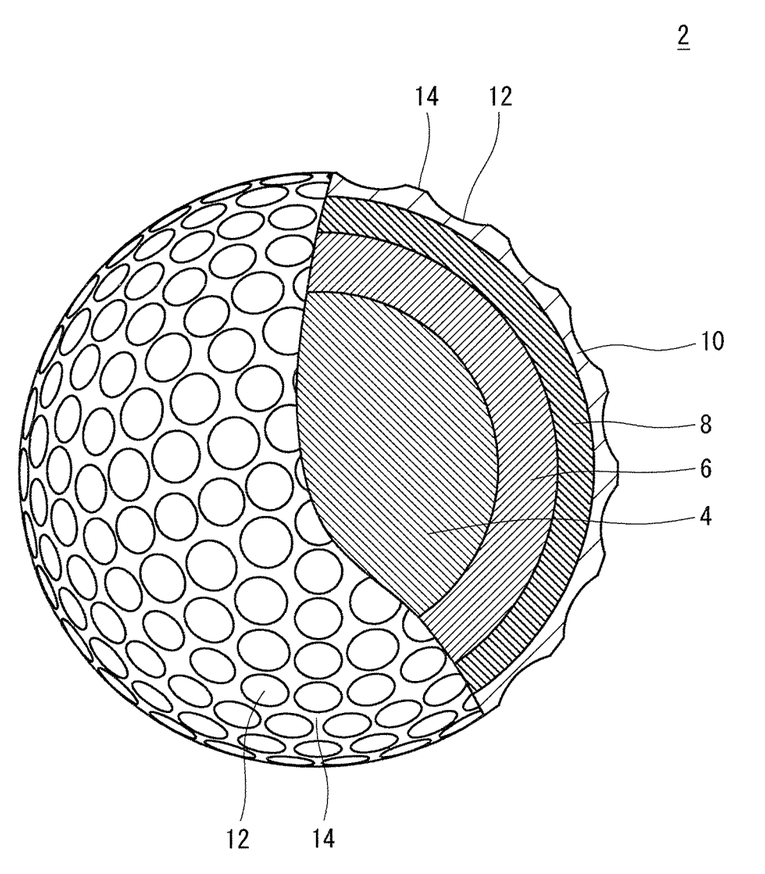
FIG. 1 is a cross-sectional view of a golf ball according to one embodiment of the present invention.

A golf ball 2 shown in FIG. 1 includes a spherical inner core 4, an outer core 6 positioned outside the inner core 4, a mid layer 8 positioned outside the outer core 6, and a cover 10 positioned outside the mid layer 8. The golf ball 2 has a plurality of dimples 12 on the surface thereof. Of the surface of the golf ball 2, a part other than the dimples 12 is a land 14. The golf ball 2 includes a paint layer and a mark layer on the external side of the cover 10 although these layers are not shown in the drawing. The golf ball 2 may include another layer between the outer core 6 and the mid layer 8. The golf ball 2 may include another layer between the mid layer 8 and the cover 10.

The golf ball 2 preferably has a diameter of equal to or greater than 40 mm but equal to or less than 45 mm. From the standpoint of conformity to the rules established by the United States Golf Association (USGA), the diameter is particularly preferably equal to or greater than 42.67 mm. In light of suppression of air resistance, the diameter is more preferably equal to or less than 44 mm and particularly preferably equal to or less than 42.80 mm. The golf ball 2 preferably has a weight of equal to or greater than 40 g but equal to or less than 50 g. In light of attainment of great inertia, the weight is more preferably equal to or greater than 44 g and particularly preferably equal to or greater than 45.00 g. From the standpoint of conformity to the rules established by the USGA, the weight is particularly preferably equal to or less than 45.93 g.

The inner core 4 is formed by crosslinking a rubber composition. Examples of preferable base rubbers for use in the rubber composition include polybutadienes, polyisoprenes, styrene-butadiene copolymers, ethylene-propylene-diene copolymers, and natural rubbers. In light of resilience performance, polybutadienes are preferable. When a polybutadiene and another rubber are used in combination, it is preferred if the polybutadiene is a principal component. Specifically, the proportion of the polybutadiene to the entire base rubber is preferably equal to or greater than 50% by weight and particularly preferably equal to or greater than 80% by weight. A polybutadiene in which the proportion of cis-1,4 bonds is equal to or greater than 80% is particularly preferable.

The rubber composition of the inner core 4 preferably includes a co-crosslinking agent. Preferable co-crosslinking agents in light of resilience performance are monovalent or bivalent metal salts of an $\alpha,\beta$-unsaturated carboxylic acid having 2 to 8 carbon atoms. Examples of preferable co-crosslinking agents include zinc acrylate, magnesium acrylate, zinc methacrylate, and magnesium methacrylate. In light of resilience performance, zinc acrylate and zinc methacrylate are particularly preferable.

The rubber composition may include a metal oxide and an $\alpha,\beta$-unsaturated carboxylic acid having 2 to 8 carbon atoms. They both react with each other in the rubber composition to obtain a salt. The salt serves as a co-crosslinking agent. Examples of preferable $\alpha,\beta$-unsaturated carboxylic acids include acrylic acid and methacrylic acid. Examples of preferable metal oxides include zinc oxide and magnesium oxide.

In light of resilience performance of the golf ball 2, the amount of the co-crosslinking agent per 100 parts by weight of the base rubber is preferably equal to or greater than 10 parts by weight and particularly preferably equal to or greater than 15 parts by weight. In light of spin suppression upon a shot with a driver, the amount is preferably equal to or less than 40 parts by weight and particularly preferably equal to or less than 35 parts by weight.

Preferably, the rubber composition of the inner core 4 includes an organic peroxide. The organic peroxide serves as a crosslinking initiator. The organic peroxide contributes to the resilience performance of the golf ball 2. Examples of suitable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. An organic peroxide with particularly high versatility is dicumyl peroxide.

In light of resilience performance of the golf ball 2, the amount of the organic peroxide per 100 parts by weight of the base rubber is preferably equal to or greater than 0.1 parts by weight, more preferably equal to or greater than 0.3 parts by weight, and particularly preferably equal to or greater than 0.5 parts by weight. In light of spin suppression upon a shot with a driver, the amount is preferably equal to or less than 3.0 parts by weight, more preferably equal to or less than 2.8 parts by weight, and particularly preferably equal to or less than 2.5 parts by weight.

Preferably, the rubber composition of the inner core 4 includes an organic sulfur compound. Organic sulfur compounds include naphthalenethiol compounds, benzenethiol compounds, and disulfide compounds.

Examples of naphthalenethiol compounds include 1-naphthalenethiol, 2-naphthalenethiol, 4-chloro-1-naphthalenethiol, 4-bromo-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol.

Examples of benzenethiol compounds include benzenethiol, 4-chlorobenzenethiol, 3-chlorobenzenethiol, 4-bromobenzenethiol, 3-bromobenzenethiol, 4-fluorobenzenethiol, 4-iodobenzenethiol, 2,5-dichlorobenzenethiol, 3,5-dichlorobenzenethiol, 2,6-dichlorobenzenethiol, 2,5-dibromobenzenethiol, 3,5-dibromobenzenethiol, 2-chloro-5-bromobenzenethiol, 2,4,6-trichlorobenzenethiol, 2,3,4,5,6-pentachlorobenzenethiol, 2,3,4,5,6-pentafluorobenzenethiol, 4-cyanobenzenethiol, 2-cyanobenzenethiol, 4-nitrobenzenethiol, and 2-nitrobenzenethiol.

Examples of disulfide compounds include diphenyl disulfide, bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide, bis(4-cyanophenyl)disulfide, bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, bis(2-cyano-5-bromophenyl)disulfide, bis(2,4,6-trichlorophenyl)disulfide, bis(2-cyano-4-chloro-6-bromophenyl)disulfide, bis(2,3,5,6-tetrachlorophenyl)disulfide, bis(2,3,4,5,6-pentachlorophenyl)disulfide, and bis(2,3,4,5,6-pentabromophenyl)disulfide.

In light of resilience performance of the golf ball 2, the amount of the organic sulfur compound per 100 parts by weight of the base rubber is preferably equal to or greater than 0.1 parts by weight and particularly preferably equal to or greater than 0.2 parts by weight. In light of spin suppression upon a shot with a driver, the amount is preferably equal to or less than 1.5 parts by weight, more preferably equal to or less than 1.0 parts by weight, and particularly preferably equal to or less than 0.8 parts by weight. Two or more organic sulfur compounds may be used in combination.

The rubber composition of the inner core 4 may include a filler for the purpose of specific gravity adjustment and the like. Examples of suitable fillers include zinc oxide, barium sulfate, calcium carbonate, and magnesium carbonate. The amount of the filler is determined as appropriate so that the intended specific gravity of the inner core 4 is accomplished. The rubber composition may include various additives, such as sulfur, a carboxylic acid, a carboxylate, an anti-aging agent, a coloring agent, a plasticizer, a dispersant, and the like, in an adequate amount. The rubber composition may include crosslinked rubber powder or synthetic resin powder.

The inner core 4 preferably has a diameter D1 of equal to or greater than 15.0 mm. With the golf ball 2 that includes the inner core 4 having a diameter D1 of equal to or greater than 15.0 mm, spin upon a shot with a driver is suppressed. In this respect, the diameter D1 is more preferably equal to or greater than 18.0 mm and particularly preferably equal to or greater than 20.0 mm. From the standpoint that the outer core 6 can have a sufficient thickness, the diameter D1 is preferably equal to or less than 32.0 mm, more preferably equal to or less than 29.0 mm, and particularly preferably equal to or less than 27.0 mm.

The inner core 4 preferably has a volume V1 of equal to or greater than 1700 mm$^3$. With the golf ball 2 that includes the inner core 4 having a volume V1 of equal to or greater than 1700 mm$^3$, spin upon a shot with a driver is suppressed. In this respect, the volume V1 is more preferably equal to or greater than 3000 mm$^3$ and particularly preferably equal to or greater than 4200 mm$^3$. From the standpoint that the outer core 6 can have a sufficient volume V2, the volume V1 is preferably equal to or less than 17000 mm$^3$, more preferably equal to or less than 13000 mm$^3$, and particularly preferably equal to or less than 10300 mm$^3$.

The inner core 4 has a weight of preferably equal to or greater than 10 g but equal to or less than 30 g. The temperature for crosslinking the inner core 4 is equal to or higher than 140° C. but equal to or lower than 180° C. The time period for crosslinking the inner core 4 is equal to or longer than 10 minutes but equal to or shorter than 60 minutes.

In the golf ball 2, the difference (H1in−H1o) between a hardness H1o at the central point of the inner core 4 and a boundary inside hardness H1in of the inner core 4 is great. The inner core 4 having the great difference (H1in−H1o) has a so-called outer-hard/inner-soft structure. When the golf ball 2 including the inner core 4 is hit with a driver, the spin is suppressed. When the golf ball 2 including the inner core 4 is hit with a driver, a high launch angle is obtained.

Upon a shot with a driver, an appropriate trajectory height and appropriate flight duration are required. With the golf ball 2 that achieves a desired trajectory height and desired flight duration at a high spin rate, the run after landing is short. With the golf ball 2 that achieves a desired trajectory height and desired flight duration at a high launch angle, the run after landing is long. In light of flight distance, the golf ball 2 that achieves a desired trajectory height and desired flight duration at a high launch angle is preferable. The inner core 4 having an outer-hard/inner-soft structure can contribute to a high launch angle and a low spin rate as described above. The golf ball 2 including the inner core 4 has excellent flight performance.

In light of flight performance, the difference (H1in−H1o) is preferably equal to or greater than 5, more preferably equal to or greater than 8, and particularly preferably equal to or greater than 10. In light of ease of producing the inner core 4, the difference (H1in−H1o) is preferably equal to or less than 40 and particularly preferably equal to or less than 30. Preferably, in the inner core 4, the hardness gradually increases from the central point thereof toward the surface thereof.

In light of resilience performance, the central hardness H1o is preferably equal to or greater than 30, more preferably equal to or greater than 35, and particularly preferably equal to or greater than 40. In light of spin suppression, the hardness H1o is preferably equal to or less than 80, more preferably equal to or less than 75, and particularly preferably equal to or less than 70.

The hardness H1o is measured with a Shore C type hardness scale mounted to an automated hardness meter (trade name "digi test II" manufactured by Heinrich Bareiss Prüfgerätebau GmbH). The hardness scale is pressed against the central point of the cross-section of a hemisphere obtained by cutting the golf ball 2. The measurement is conducted in the environment of 23° C.

In light of spin suppression, the boundary inside hardness H1in is preferably equal to or greater than 60, more preferably equal to or greater than 65, and particularly preferably equal to or greater than 70. In light of durability of the golf ball 2, the hardness H1in is preferably equal to or less than 85, more preferably equal to or less than 80, and particularly preferably equal to or less than 78.

The hardness H1in is measured with a Shore C type hardness scale mounted to an automated hardness meter (trade name "digi test II" manufactured by Heinrich Bareiss Prüfgerätebau GmbH). The hardness scale is pressed against a cross-section of the golf ball 2 that has been cut into two halves. The hardness scale is pressed against a point separated by 1 mm radially inward from the boundary between the inner core 4 and the outer core 6. The measurement is conducted in the environment of 23° C.

In the inner core 4, a value Va calculated by the following mathematical formula exceeds 600 and is less than 1000.

$$Va=(H1o+H1in)*(D1/2)/2$$

In other words, the inner core 4 meets the following mathematical formula (3).

$$600<(H1o+H1in)*(D1/2)/2<1000 \qquad (3)$$

The value Va is approximate to the integral of a hardness distribution of the inner core 4. With the golf ball 2 that includes the inner core 4 having a value Va of exceeding 600, the spin rate upon a shot with a driver is low. In this respect, the value Va is more preferably equal to or greater than 650 and particularly preferably equal to or greater than 700. With the golf ball 2 that includes the inner core 4 having a value Va of less than 1000, the initial speed of the ball upon a shot with a driver is high. In this respect, the value Va is preferably equal to or less than 950 and particularly preferably equal to or less than 900.

The outer core 6 is formed by crosslinking a rubber composition. The composition can include the base rubber described above for the inner core 4.

The rubber composition of the outer core 6 preferably includes a co-crosslinking agent. Preferable co-crosslinking agents in light of resilience performance are monovalent or bivalent metal salts of an α,β-unsaturated carboxylic acid having 2 to 8 carbon atoms. Examples of preferable co-crosslinking agents include zinc acrylate, magnesium acrylate, zinc methacrylate, and magnesium methacrylate. In light of resilience performance, zinc acrylate and zinc methacrylate are particularly preferable.

The rubber composition may include a metal oxide and an α,β-unsaturated carboxylic acid having 2 to 8 carbon atoms. They both react with each other in the rubber composition to obtain a salt. The salt serves as a co-crosslinking agent. Examples of preferable α,β-unsaturated carboxylic acids include acrylic acid and methacrylic acid. Examples of preferable metal oxides include zinc oxide and magnesium oxide.

In light of resilience performance of the golf ball 2, the amount of the co-crosslinking agent per 100 parts by weight of the base rubber is preferably equal to or greater than 20 parts by weight and particularly preferably equal to or greater than 25 parts by weight. In light of feel at impact, the amount is preferably equal to or less than 50 parts by weight and particularly preferably equal to or less than 45 parts by weight.

Preferably, the rubber composition of the outer core 6 includes an organic peroxide. The organic peroxide serves as a crosslinking initiator. The organic peroxide contributes to the resilience performance of the golf ball 2. The rubber composition of the outer core 6 can include the organic peroxide described above for the inner core 4.

In light of resilience performance of the golf ball 2, the amount of the organic peroxide per 100 parts by weight of the base rubber is preferably equal to or greater than 0.1 parts by weight, more preferably equal to or greater than 0.3 parts by weight, and particularly preferably equal to or greater than 0.5 parts by weight. In light of feel at impact, the amount is preferably equal to or less than 3.0 parts by weight, more preferably equal to or less than 2.8 parts by weight, and particularly preferably equal to or less than 2.5 parts by weight.

Preferably, the rubber composition of the outer core 6 includes an organic sulfur compound. The rubber composition can include the organic sulfur compound described above for the inner core 4.

In light of resilience performance of the golf ball 2, the amount of the organic sulfur compound per 100 parts by weight of the base rubber is preferably equal to or greater than 0.1 parts by weight and particularly preferably equal to or greater than 0.2 parts by weight. In light of feel at impact, the amount is preferably equal to or less than 1.5 parts by weight, more preferably equal to or less than 1.0 parts by weight, and particularly preferably equal to or less than 0.8 parts by weight.

The rubber composition of the outer core 6 may include a filler for the purpose of specific gravity adjustment and the like. Examples of suitable fillers include zinc oxide, barium sulfate, calcium carbonate, and magnesium carbonate. The amount of the filler is determined as appropriate so that the intended specific gravity of the outer core 6 is accomplished. The rubber composition may include various additives, such as sulfur, a carboxylic acid, a carboxylate, an anti-aging agent, a coloring agent, a plasticizer, a dispersant, and the like, in an adequate amount. The rubber composition may include crosslinked rubber powder or synthetic resin powder.

The outer core 6 preferably has a diameter D2 of equal to or greater than 37.0 mm. The golf ball 2 that includes the outer core 6 having a diameter D2 of equal to or greater than 37.0 mm has excellent resilience performance upon a shot with a driver. In this respect, the diameter D2 is more preferably equal to or greater than 37.5 mm and particularly preferably equal to or greater than 38.0 mm. From the standpoint that the mid layer 8 and the cover 10 can have sufficient thicknesses, the diameter D2 is preferably equal to or less than 40.5 mm, more preferably equal to or less than 40.0 mm, and particularly preferably equal to or less than 39.5 mm.

The outer core 6 preferably has a volume V2 of equal to or greater than 19000 mm$^3$. The golf ball 2 that includes the outer core 6 having a volume V2 of equal to or greater than 19000 mm$^3$ has excellent resilience performance. In this respect, the volume V2 is more preferably equal to or greater than 21000 mm$^3$ and particularly preferably equal to or greater than 22000 mm$^3$. From the standpoint that the mid layer 8 and the cover 10 can have sufficient thicknesses, the volume V2 is preferably equal to or less than 28000 mm$^3$, more preferably equal to or less than 26000 mm$^3$, and particularly preferably equal to or less than 25000 mm$^3$. In the present embodiment, the volume V2 is calculated by subtracting the volume of the inner core 4 from the volume of a sphere consisting of the inner core 4 and the outer core 6.

The outer core 6 has a weight of preferably equal to or greater than 10 g but equal to or less than 30 g. The temperature for crosslinking the outer core 6 is equal to or higher than 140° C. but equal to or lower than 180° C. The time period for crosslinking the outer core 6 is equal to or longer than 10 minutes but equal to or shorter than 60 minutes.

In the golf ball 2, the difference (H2s-H2out) between a surface hardness H2s and a boundary outside hardness H2out of the outer core 6 meets the following mathematical formula (2).

$$-2 < H2s - H2out < 2 \qquad (2)$$

In other words, the difference (H2s-H2out) is small. A hardness distribution of the outer core 6 is close to being flat. In the outer core 6, the energy loss upon hitting with a driver is low. The golf ball 2 that includes the outer core 6 has excellent resilience performance upon a shot with a driver.

In light of flight performance, the difference (H2s-H2out) is preferably equal to or greater than −1 but equal to or less than 1. The difference (H2s-H2out) may be zero.

The difference between a Shore C hardness at a point having a highest hardness and a Shore C hardness at a point having a lowest hardness in the zone from the boundary between the inner core 4 and the outer core 6 to the surface of the outer core 6 is preferably equal to or less than 5, more preferably equal to or less than 4, and particularly preferably equal to or less than 3.

In light of resilience performance, the boundary outside hardness H2out is preferably equal to or greater than 60, more preferably equal to or greater than 70, and particularly preferably equal to or greater than 75. In light of feel at impact, the hardness H2out is preferably equal to or less than 90, more preferably equal to or less than 87, and particularly preferably equal to or less than 85.

The hardness H2out is measured with a Shore C type hardness scale mounted to an automated hardness meter (trade name "digi test II" manufactured by Heinrich Bareiss Prüfgerätebau GmbH). The hardness scale is pressed against a cross-section of the golf ball 2 that has been cut into two halves. The hardness scale is pressed against a point separated by 1 mm radially outward from the boundary between the inner core 4 and the outer core 6. The measurement is conducted in the environment of 23° C.

In light of spin suppression upon a shot with a driver, the surface hardness H2s is preferably equal to or greater than 70, more preferably equal to or greater than 72, and particularly preferably equal to or greater than 74. In light of durability of the golf ball 2, the hardness H2s is preferably equal to or less than 90, more preferably equal to or less than 88, and particularly preferably equal to or less than 86.

The hardness H2s is measured with a Shore C type hardness scale mounted to an automated hardness meter (trade name "digi test II" manufactured by Heinrich Bareiss Prüfgerätebau GmbH). The hardness scale is pressed against the surface of the outer core 6. The measurement is conducted in the environment of 23° C.

A core having a small difference (H2s-H2out) can be obtained by a two-stage crosslinking process. Specifically, in a first crosslinking process, a rubber composition is crosslinked at a predetermined temperature. In a second crosslinking process, the rubber composition is crosslinked at a temperature higher than the temperature in the first crosslinking process.

The ratio (V2/V1) between the volume V2 of the outer core 6 and the volume V1 of the inner core 4 meets the following mathematical formula (1).

$$1.0 < V2/V1 < 7.0 \qquad (1)$$

In other words, the ratio (V2/V1) exceeds 1.0 and is less than 7.0. The golf ball 2 having a ratio (V2/V1) of exceeding 1.0 has excellent resilience performance upon a shot with a driver. In this respect, the ratio (V2/V1) is more preferably equal to or greater than 2.0 and particularly preferably equal to or greater than 2.5. With the golf ball 2 having a ratio (V2/V1) of less than 7.0, spin upon a shot with a driver can be suppressed. In this respect, the ratio (V2/V1) is more preferably equal to or less than 5.0 and particularly preferably equal to or less than 4.0.

The mid layer 8 is positioned between the outer core 6 and the cover 10. The mid layer 8 is formed from a thermoplastic resin composition. Examples of the base polymer of the resin composition include ionomer resins, polyesters, polyamides, polyurethanes, polyolefins, and polystyrenes. Ionomer resins are particularly preferable. Ionomer resins are highly elastic. The golf ball 2 that includes the mid layer 8 including an ionomer resin has excellent resilience performance upon a shot with a driver.

An ionomer resin and another resin may be used in combination. In this case, in light of resilience performance, the ionomer resin is included as the principal component of the base polymer. The proportion of the ionomer resin to the entire base polymer is preferably equal to or greater than 50% by weight, more preferably equal to or greater than 70% by weight, and particularly preferably equal to or greater than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. For the binary copolymer and the ternary copolymer, preferable α-olefins are ethylene and propylene, while preferable α,β-unsaturated carboxylic acids are acrylic acid and methacrylic acid. A particularly preferable ionomer resin is a copolymer formed with ethylene and acrylic acid. Another particularly preferable ionomer resin is a copolymer formed with ethylene and methacrylic acid.

In the binary copolymer and the ternary copolymer, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7329", and "Himilan AM7337", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

The resin composition of the mid layer 8 may include a styrene block-containing thermoplastic elastomer. The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferable. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact, the content is preferably equal to or less than 50% by weight, more preferably equal to or less than 47% by weight, and particularly preferably equal to or less than 45% by weight.

In the present invention, styrene block-containing thermoplastic elastomers include an alloy comprising an olefin and one or more members selected from the group consisting of SBS, SIS, SIBS, SEBS, SEPS, and SEEPS. The olefin component in the alloy is presumed to contribute to improvement of compatibility with another base polymer. The alloy can contribute to the resilience performance of the golf ball 2. An olefin having 2 to 10 carbon atoms is preferable. Examples of suitable olefins include ethylene, propylene, butene, and pentene. Ethylene and propylene are particularly preferable.

Specific examples of polymer alloys include trade names "RABALON T3221C", "RABALON T3339C", "RABALON SJ4400N", "RABALON SJ5400N", "RABALON SJ6400N", "RABALON SJ7400N", "RABALON SJ8400N", "RABALON SJ9400N", and "RABALON SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "SEPTON HG-252" manufactured by Kuraray Co., Ltd.

In light of feel at impact, the proportion of the styrene block-containing thermoplastic elastomer to the entire base polymer is preferably equal to or greater than 1% by weight and particularly preferably equal to or greater than 2% by weight. In light of spin suppression upon a shot with a driver, the proportion is preferably equal to or less than 15% by weight, more preferably equal to or less than 10% by weight, and particularly preferably equal to or less than 5% by weight.

The resin composition of the mid layer 8 may include a polyamide. With the golf ball 2 that includes the mid layer 8 including a polyamide, the spin upon a shot with a driver is suppressed. Specific examples of polyamides include polyamide 6, polyamide 11, polyamide 12, polyamide 66, and polyamide 610. In light of versatility, polyamide 6 is preferable.

In light of spin suppression, the proportion of the polyamide to the entire base polymer is preferably equal to or greater than 5% by weight, more preferably equal to or greater than 10% by weight, and particularly preferably equal to or greater than 15% by weight. In light of feel at impact, the proportion is preferably equal to or less than 50% by weight, more preferably equal to or less than 45% by weight, and particularly preferably equal to or less than 40% by weight.

The resin composition of the mid layer 8 may include a filler for the purpose of specific gravity adjustment and the like. Examples of suitable fillers include zinc oxide, barium sulfate, calcium carbonate, and magnesium carbonate. The resin composition may include powder of a metal with a high specific gravity. Specific examples of metals with a high specific gravity include tungsten and molybdenum. The amount of the filler is determined as appropriate so that the intended specific gravity of the mid layer 8 is accomplished. The resin composition may include a coloring agent, cross-linked rubber powder, or synthetic resin powder. When the hue of the golf ball 2 is white, a typical coloring agent is titanium dioxide.

The mid layer 8 preferably has a hardness Hm of equal to or greater than 55. With the golf ball 2 that includes the mid layer 8 having a hardness Hm of equal to or greater than 55, the spin rate upon a shot with a driver is suppressed. The mid layer 8 can contribute to the flight performance of the golf ball 2. In this respect, the hardness Hm is more preferably equal to or greater than 58 and particularly preferably equal to or greater than 61. In light of feel at impact upon a shot with a driver, the hardness Hm is preferably equal to or less than 80, more preferably equal to or less than 75, and particularly preferably equal to or less than 72.

The hardness Hm of the mid layer 8 is measured according to the standards of "ASTM-D 2240-68". The hardness Hm is measured with a Shore D type hardness scale mounted to an automated hardness meter (trade name "digi test II" manufactured by Heinrich Bareiss Prüfgerätebau GmbH). For the measurement, a sheet that is formed by hot press, is formed from the same material as that of the mid layer 8, and has a thickness of about 2 mm is used. Prior to the measurement, a sheet is kept at 23° C. for two weeks. At the measurement, three sheets are stacked.

The mid layer 8 has a thickness Tm of preferably equal to or greater than 0.3 mm but equal to or less than 2.5 mm. With the golf ball 2 that includes a mid layer 8 having a thickness Tm of equal to or greater than 0.3 mm, the spin upon a shot with a driver is suppressed. In this respect, the thickness Tm is more preferably equal to or greater than 0.5 mm and particularly preferably equal to or greater than 0.8 mm. The golf ball 2 that includes the mid layer 8 having a thickness Tm of equal to or less than 2.5 mm has excellent feel at impact. In this respect, the thickness Tm is more preferably equal to or less than 2.0 mm and particularly preferably equal to or less than 1.8 mm. The thickness Tm is measured at a position immediately below the land 14.

The golf ball 2 may include two or more mid layers 8 positioned between the outer core 6 and the cover 10. In this case, the thickness of each mid layer 8 preferably falls within the above range.

The cover 10 is the outermost layer except the mark layer and the paint layer. The cover 10 is formed from a resin composition. The resin composition includes, as base polymers, (A) a polyurethane, and
(B) a polyrotaxane.

The polyrotaxane (B) has a cyclodextrin, a linear molecule that is threaded through the ring structure of the cyclodextrin, and a blocking group that is located at each of both ends of the linear molecule and prevents detachment of the cyclodextrin. In the polyrotaxane (B), at least a part of the hydroxyl groups of the cyclodextrin is modified with a caprolactone chain via a —O—$C_3H_6$—O— group.

When the golf ball 2 that includes the polyurethane (A) and the polyrotaxane (B) in the cover 10 is hit with a short iron in a wet state, the spin rate of the golf ball 2 is high. The polyrotaxane (B) contributes to controllability in a wet state. The detailed reason for this has not been identified. However, the polyrotaxane (B) is thought to have some effect on deformation behavior of the cover 10 when the golf ball 2 and a clubface collide against each other. Particularly, with the cover 10 of which a hardness Hc is low, the effect of the polyrotaxane (B) is significant.

The polyurethane (A) has a urethane bond within the molecule. The urethane bond can be formed by reacting a polyol with a polyisocyanate. In addition to the reaction for the urethane bond, a chain-lengthening reaction may be carried out. The chain-lengthening reaction can be carried out by a polyamine or a polyol having a low molecular weight.

Examples of the polyurethane (A) include (A1) a polyurethane including a polyisocyanate component and a high-molecular-weight polyol component, (A2) a polyurethane including a polyisocyanate component, a high-molecular-weight polyol component, and a low-molecular-weight polyol component, (A3) a polyurethane including a polyisocyanate component, a high-molecular-weight polyol component, and a polyamine component, and (A4) a polyurethane including a polyisocyanate component, a high-molecular-weight polyol component, a low-molecular-weight polyol component, and polyamine component.

The polyol, as a material for the urethane bond, has a plurality of hydroxyl groups. Low-molecular-weight polyols and high-molecular-weight polyols can be used.

Examples of low-molecular-weight polyols include diols, triols, tetraols, and hexaols. Specific examples of diols include ethylene glycol, diethylene glycol, triethylene glycol, 1,2-propanediol, 1,3-propanediol, 2-methyl-1,3-propanediol, dipropylene glycol, 1,2-butanediol, 1,3-butanediol, 1,4-butanediol, 2,3-butanediol, 2,3-dimethyl-2,3-butanediol, neopentyl glycol, pentanediol, hexanediol, heptanediol, octanediol, and 1,6-cyclohexanedimethylol. Aniline diols or bisphenol A diols may be used. Specific examples of triols include glycerin, trimethylol propane, and hexanetriol. Specific examples of tetraols include pentaerythritol and sorbitol.

Examples of high-molecular-weight polyols include polyether polyols such as polyoxyethylene glycol (PEG), polyoxypropylene glycol (PPG), and polytetramethylene ether glycol (PTMG); condensed polyester polyols such as polyethylene adipate (PEA), polybutylene adipate (PBA), and polyhexamethylene adipate (PHMA); lactone polyester polyols such as poly-ε-caprolactone (PCL); polycarbonate polyols such as polyhexamethylene carbonate; and acrylic polyols. Two or more polyols may be used in combination. In light of feel at impact of the golf ball 2 upon a shot with a driver, the high-molecular-weight polyol has a number average molecular weight of preferably equal to or greater than 400 and more preferably equal to or greater than 1000. The number average molecular weight is preferably equal to or less than 10000. Particularly preferably polyols are diols.

The polyisocyanate, as a material for the urethane bond, has two or more isocyanate groups. Examples of polyisocyanates include aromatic polyisocyanates, alicyclic polyisocyanates, and aliphatic polyisocyanates. Two or more types of polyisocyanates may be used in combination.

Examples of aromatic polyisocyanates include 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI).

Examples of alicyclic polyisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI).

One example of aliphatic polyisocyanates is hexamethylene diisocyanate (HDI).

In light of scuff resistance, aromatic polyisocyanates are preferable. In light of weather resistance, TMXDI, XDI, HDI, $H_6XDI$, IPDI, $H_{12}MDI$, and NBD are preferable, and $H_{12}MDI$ is particularly preferable. $H_{12}MDI$ is excellent in both scuff resistance and weather resistance.

The polyamine for the chain-lengthening reaction has two or more amino groups. Examples of polyamines include aliphatic polyamines such as ethylenediamine, propylenediamine, butylenediamine, and hexamethylenediamine; alicyclic polyamines such as isophoronediamine and piperazine; and aromatic polyamines.

In an aromatic polyamine, an amino group is bonded to an aromatic ring. The amino group may be bonded directly to the aromatic ring. The amino group may be bonded indirectly to the aromatic ring via a lower alkylene group.

Aromatic polyamines include monocyclic aromatic polyamines and polycyclic aromatic polyamines. In a monocyclic aromatic polyamine, two or more amino groups are bounded to one aromatic ring. A polycyclic aromatic polyamine has two or more aminophenyl groups. In each of the aminophenyl groups, one or more amino groups are bonded to one aromatic ring.

Examples of monocyclic aromatic polyamines include polyamines in which an amino group is bonded directly to an aromatic ring, and polyamines in which an amino group is bonded to an aromatic ring via a lower alkylene group. Specific examples of monocyclic aromatic polyamines in which an amino group is bonded directly to an aromatic ring include phenylenediamine, toluenediamine, diethyltoluenediamine, and dimethylthiotoluenediamine. Specific examples of monocyclic aromatic polyamines in which an amino group is bonded to an aromatic ring via a lower alkylene group include xylylenediamine.

Examples of polycyclic aromatic polyamines include poly(aminobenzene) in which two or more aminophenyl groups are bonded directly to each other, and polyamines in which two or more aminophenyl groups are bonded to each other via a lower alkylene group or an alkylene oxide group. Diaminodiphenylalkanes in which two aminophenyl groups are bonded to each other via a lower alkylene group are preferable, and 4,4'-diaminodiphenylmethane and derivatives thereof are particularly preferable.

The cover 10 may include a thermoplastic polyurethane, or may include a thermosetting polyurethane. In light of productivity, the thermoplastic polyurethane is preferable. The thermoplastic polyurethane includes a polyurethane component as a hard segment, and a polyester component or a polyether component as a soft segment. The thermoplastic polyurethane is flexible. The cover 10 in which the polyurethane is used has excellent scuff resistance.

Specific examples of the thermoplastic polyurethane include trade names "Elastollan NY80A", "Elastollan NY82A", "Elastollan NY84A", "Elastollan NY85A", "Elastollan NY86A", "Elastollan NY88A", "Elastollan NY90A", "Elastollan NY92A", "Elastollan NY95A", "Elastollan NY97A", "Elastollan NY585", "Elastollan KP016N", and "Elastollan 1190ATR", manufactured by BASF Japan Ltd.; and trade names "RESAMINE P4585LS" and "RESAMINE PS62490", manufactured by Dainichiseika Color & Chemicals Mfg. Co., Ltd.

In light of resilience performance of the golf ball 2, the polyurethane (A) has a loss elastic modulus E" of preferably equal to or greater than $5.0*10^6$ Pa, more preferably equal to or greater than $7.0*10^6$ Pa, and particularly preferably equal to or greater than $9.0*10^6$ Pa. In light of controllability upon hitting with a short iron in a wet state, the loss elastic modulus E" is preferably equal to or less than $5.0*10^7$ Pa, more preferably equal to or less than $4.8*10^7$ Pa, and particularly preferably equal to or less than $4.5*10^7$ Pa.

The loss elastic modulus E" of the polyurethane (A) is measured with the dynamic viscoelasticity measuring apparatus "Rheogel-E4000", manufactured by UBM. The measurement conditions are as follows.

Measurement mode: tensile
Measurement temperature: 0° C.
Vibration frequency: 10 Hz
Measurement distortion: 0.05%

A test piece for the measurement has a width of 4 mm and an inter-clamp distance of 20 mm. The test piece is cut out from a sheet. The sheet has a thickness of 0.5 mm. The sheet is formed by hot press from the polyurethane.

The polyrotaxane (B) has a cyclodextrin, a linear molecule, and a blocking group.

The cyclodextrin is a generic term for oligosaccharides having a ring structure. A typical cyclodextrin is an oligosaccharide in which 6 to 8 D-glucopyranose units are linked to each other by α-1,4-glucoside linkage to form a ring. Specific examples of cyclodextrins include α-cyclodextrin (the number of glucoses: 6), β-cyclodextrin (the number of glucoses: 7), and γ-cyclodextrin (the number of glucoses: 8). α-cyclodextrin is preferable. The polyrotaxane (B) may include two or more types of cyclodextrins.

The linear molecule is threaded through the ring structure of the cyclodextrin. In the polyrotaxane (B), the cyclodextrin is rotatable relative to the linear molecule. This rotatability is referred to as pulley effect. Due to the pulley effect, the polyrotaxane (B) has excellent viscoelasiticity. When tension is applied to the polyrotaxane (B), the tension is distributed due to the pulley effect.

Examples of the linear molecule include polyalkylenes, polyesters, polyethers, polyacrylics. Polyethers are preferable, and polyethylene glycol is particularly preferable. In polyethylene glycol, steric hindrance is small. Therefore, polyethylene glycol is easily threaded through the ring structure of the cyclodextrin.

The weight average molecular weight of the linear molecule is preferably equal to or greater than 5,000 and particularly preferably equal to or greater than 6,000. The molecular weight is preferably equal to or less than 100,000 and particularly preferably equal to or less than 80,000.

A linear molecule having functional groups at both ends thereof is preferable. In the linear molecule having the functional groups, reaction with a blocking group described in detail later easily takes place. Examples of the functional groups include hydroxyl group, carboxy group, amino group, and thiol group.

The blocking group is located at each of both ends of the linear molecule. The blocking group prevents detachment of the cyclodextrin from the linear molecule. A bulky blocking group can physically prevent the detachment. An ionic blocking group can electrostatically prevent the detachment. Examples of bulky blocking groups include cyclodextrins and adamantyl group.

One linear molecule can be threaded through a plurality of cyclodextrins. The ratio of the number of cyclodextrins through which the linear molecule is actually threaded, relative to the maximum number of cyclodextrins through which one linear molecule can be threaded, is preferably equal to or greater than 0.06 but equal to or less than 0.61. In the polyrotaxane (B) in which the ratio is equal to or greater than 0.06, tension is sufficiently distributed. In this respect, the ratio is more preferably equal to or greater than 0.11 and particularly preferably equal to or greater than 0.24. In the polyrotaxane (B) in which the ratio is equal to or less than 0.61, the cyclodextrin is easily movable. In this respect, the ratio is more preferably equal to or less than 0.48 and particularly preferably equal to or less than 0.41.

The polyrotaxane (B) in which at least a part of the hydroxyl groups included in the cyclodextrin is modified with a caprolactone chain is preferable. The polyrotaxane (B) in which this modification is made has excellent compatibility with the polyurethane (A). In addition, the polyrotaxane (B) in which this modification is made is flexible. The polyrotaxane (B) can contribute to controllability upon hitting with a short iron in a wet state.

Hereinafter, one example of a method for the modification will be described. First, the hydroxyl groups of the cyclodextrin are hydroxypropylated by propylene oxide. Next, s-caprolactone is added. As a result of the addition, ring-opening polymerization takes place. By this reaction, a caprolactone chain —(CO(CH$_2$)$_5$O)nH (n is a natural number) is bonded to the outside of the ring structure of the cyclodextrin via a —O—C$_3$H$_6$—O— group. n represents a degree of polymerization. n is preferably 1 to 100, more preferably 2 to 70, and particularly preferably 3 to 40. By the ring-opening polymerization, a hydroxyl group is formed at the other end of the caprolactone chain.

The proportion of the hydroxyl groups modified with a caprolactone chain to all the hydroxyl groups included in the cyclodextrin that has not been modified is preferably equal to or greater than 2 mol %. The polyrotaxane (B) in which the ratio is equal to or greater than 2 mol % is flexible. The polyrotaxane (B) can contribute to controllability upon hitting with a short iron in a wet state. In this respect, the ratio is more preferably equal to or greater than 5 mol % and particularly preferably equal to or greater than 10 mol %.

Specific examples of the polyrotaxane (B) modified with polycaprolactone include trade names "SeRM Super Polymer SH3400P", "SeRM Super Polymer SH2400P", and "SeRM Super Polymer SH1310P", manufactured by Advanced Softmaterials Inc.

The hydroxyl value of the polyrotaxane (B) is preferably equal to or greater than 10 mg KOH/g but equal to or less than 400 mg KOH/g. The polyrotaxane (B) having a hydroxyl value within this range has excellent compatibility with the polyurethane (A). In this respect, the hydroxyl value is more preferably equal to or greater than 15 mg KOH/g and particularly preferably equal to or greater than 20 mg KOH/g. The hydroxyl value is more preferably equal to or less than 300 mg KOH/g and particularly preferably equal to or less than 220 mg KOH/g. The hydroxyl value can be measured according to JIS K 1557-1 by the acetylation method.

The weight average molecular weight of the polyrotaxane (B) is preferably equal to or greater than 30,000 but equal to or less than 3,000,000. The polyrotaxane (B) having a weight average molecular weight of equal to or greater than 30,000 does not impair the resilience performance of the golf ball 2. In this respect, the weight average molecular weight is more preferably equal to or greater than 40,000 and particularly preferably equal to or greater than 50,000. The cover 10 including the polyrotaxane (B) having a weight average molecular weight of equal to or less than 3,000,000 is flexible. The cover 10 can contribute to controllability upon hitting with a short iron in a wet state. In this respect, the weight average molecular weight is more preferably equal to or less than 2,500,000 and particularly preferably equal to or less than 2,000,000. The weight average molecular weight is measured by gel permeation chromatography (GPC). The measurement conditions are as follows.

Reference material: polystyrene
Eluant: tetrahydrofuran
Column: organic solvent GPC column
("Shodex KF Series" manufactured by Showa Denko K.K.)

The amount of the polyrotaxane (B) in the resin composition of the cover 10 per 100 parts by weight of the polyurethane (A) is preferably equal to or greater than 1 parts by weight but equal to or less than 50 parts by weight. The golf ball 2 in which the amount is equal to or greater than 1 parts by weight has excellent controllability upon hitting with a short iron in a wet state. In this respect, the amount is more preferably equal to or greater than 3 parts by weight and particularly preferably equal to or greater than 5 parts by weight. The cover 10 in which the amount is equal to or less than 50 parts by weight has excellent moldability. In this respect, the amount is more preferably equal to or less than 20 parts by weight and particularly preferably equal to or less than 10 parts by weight.

The resin composition of the cover 10 may include another resin as a base material. Examples of the other resin include ionomer resins, polyesters, polyamides, polyolefins, and polystyrenes. The proportion of the total amount of the polyurethane (A) and the polyrotaxane (B) relative to the amount of the entire base resin is preferably equal to or greater than 85% by weight, more preferably equal to or greater than 90% by weight, and particularly preferably equal to or greater than 95% by weight. The proportion may be 100% by weight.

The resin composition of the cover 10 may include a coloring agent, a filler, a dispersant, an antioxidant, an ultraviolet absorber, a light stabilizer, a fluorescent material, a fluorescent brightener, and the like in an adequate amount. When the hue of the golf ball 2 is white, a typical coloring agent is titanium dioxide.

In light of resilience performance of the golf ball 2, the cover 10 has a loss elastic modulus E" of preferably equal to or greater than 6.0*10$^6$ Pa, more preferably equal to or greater than 9.0*10$^6$ Pa, and particularly preferably equal to or greater than 1.2*10$^7$ Pa. In light of controllability upon hitting with a short iron in a wet state, the loss elastic modulus E" is preferably equal to or less than 5.0*10$^7$ Pa, more preferably equal to or less than 4.9*10$^7$ Pa, and particularly preferably equal to or less than 4.8*10$^7$ Pa.

The loss elastic modulus E" (Pa) of the cover 10 is measured with the dynamic viscoelasticity measuring apparatus "Rheogel-E4000", manufactured by UBM. The measurement conditions are as follows.

Measurement mode: tensile
Measurement temperature: 0° C.
Vibration frequency: 10 Hz
Measurement distortion: 0.05%

A test piece for the measurement has a width of 4 mm and an inter-clamp distance of 20 mm. The test piece is cut out from a sheet. The sheet has a thickness of 0.5 mm. The sheet is formed by hot press from a resin composition that is the same as the resin composition of the cover 10.

In light of durability of the cover 10, the cover 10 has a Shore D hardness Hc of preferably equal to or greater than 15, more preferably equal to or greater than 18, and particularly preferably equal to or greater than 20. In light of controllability upon hitting with a short iron in a wet state, the hardness Hc is preferably equal to or less than 40, more preferably equal to or less than 37, and particularly preferably equal to or less than 34.

The hardness Hc of the cover 10 is measured according to the standards of "ASTM-D 2240-68". The hardness Hc is measured with a Shore D type hardness scale mounted to an automated hardness meter (trade name "digi test II" manufactured by Heinrich Bareiss Prüfgerätebau GmbH). For the measurement, a sheet that is formed by hot press, is formed from the same material as that of the cover 10, and has a thickness of about 2 mm is used. Prior to the measurement, a sheet is kept at 23° C. for two weeks. At the measurement, three sheets are stacked.

In light of controllability upon hitting with a short iron in a wet state, the cover 10 has a thickness Tc of preferably equal to or greater than 0.1 mm, more preferably equal to or greater than 0.3 mm, and particularly preferably equal to or greater than 0.4 mm. In light of spin suppression upon a shot with a driver, the thickness Tc is preferably equal to or less than 2.0 mm, more preferably equal to or less than 1.5 mm, and particularly preferably equal to or less than 1.0 mm. The thickness Tc is measured at a position immediately below the land 14.

For forming the cover 10, known methods such as injection molding, compression molding, and the like can be used. When forming the cover 10, the dimples 12 are formed by pimples formed on the cavity face of a mold.

The golf ball 2 may include a reinforcing layer between the mid layer 8 and the cover 10. The reinforcing layer firmly adheres to the mid layer 8 and also to the cover 10. The reinforcing layer suppresses separation of the mid layer 8 from the cover 10. The reinforcing layer is formed from a resin composition. Examples of a preferable base polymer of the reinforcing layer include two-component curing type epoxy resins and two-component curing type urethane resins.

The golf ball 2 preferably has an amount of compressive deformation Sb of equal to or greater than 2.0 mm but equal to or less than 3.5 mm. The golf ball 2 having an amount of compressive deformation Sb of equal to or greater than 2.0 mm has excellent feel at impact. In this respect, the amount of compressive deformation Sb is preferably equal to or greater than 2.2 mm and particularly preferably equal to or greater than 2.3 mm. The golf ball 2 having an amount of compressive deformation Sb of equal to or less than 3.5 mm has excellent resilience performance. In this respect, the amount of compressive deformation Sb is more preferably equal to or less than 3.2 mm and particularly preferably equal to or less than 3.0 mm.

For measurement of the amount of compressive deformation Sb, a YAMADA type compression tester (SCH) is used. In the tester, the golf ball 2 is placed on a hard plate made of metal. Next, a cylinder made of metal gradually descends toward the golf ball 2. The golf ball 2, squeezed between the bottom face of the cylinder and the hard plate, becomes deformed. A migration distance of the cylinder, starting from the state in which an initial load of 98 N is applied to the golf ball 2 up to the state in which a final load of 1274 N is applied thereto, is measured. A moving speed of the cylinder until the initial load is applied is 0.83 mm/s. A moving speed of the cylinder after the initial load is applied until the final load is applied is 1.67 mm/s.

In the golf ball 2, a value Vb calculated by the following mathematical formula exceeds 620 and is less than 900.

$$Vb = Tc*Hc*Hm/Tm$$

In other words, the golf ball 2 meets the following mathematical formula (4).

$$620 < Tc*Hc*Hm/Tm < 900 \qquad (4)$$

According to the finding by the present inventor, with the golf ball 2 having a value Vb of exceeding 620 and less than 900, the spin upon hitting with a driver is not excessively great, and the spin upon hitting with a short iron in a wet state is not excessively small. The golf ball 2 has excellent flight performance and excellent controllability. The value Vb is more preferably equal to or greater than 630 and particularly preferably equal to or greater than 650. The value Vb is more preferably equal to or less than 850 and particularly preferably equal to or less than 800.

In the golf ball 2 that includes the cover 10 having a low hardness Hc and a small thickness Tc, the mathematical formula (4) can be met.

EXAMPLES

The following will show the effects of the present invention by means of Examples, but the present invention should not be construed in a limited manner based on the description of these Examples.

Example 1

A rubber composition (b) was obtained by kneading 100 parts by weight of a high-cis polybutadiene (trade name "BR-730", manufactured by JSR Corporation), 26.0 parts by weight of zinc diacrylate, 5 parts by weight of zinc oxide, an appropriate amount of barium sulfate, 0.5 parts by weight of diphenyl disulfide, and 0.7 parts by weight of dicumyl peroxide. This rubber composition (b) was placed into a mold that includes upper and lower mold halves each having a hemispherical cavity, and heated at 170° C. for 15 minutes to obtain an inner core with a diameter D1 of 24 mm. The amount of barium sulfate was adjusted such that a predetermined ball weight is obtained.

A rubber composition (d) was obtained by kneading 100 parts by weight of a high-cis polybutadiene (trade name "BR-730", manufactured by JSR Corporation), 41.5 parts by weight of zinc diacrylate, 5 parts by weight of zinc oxide, an appropriate amount of barium sulfate, 0.1 parts by weight of an antioxidant (H-BHT), 0.5 parts by weight of diphenyl disulfide, and 0.7 parts by weight of dicumyl peroxide. Half shells were formed from this rubber composition (d). The inner core was covered with two of these half shells. The inner core and the half shells were placed into a mold that includes upper and lower mold halves each having a hemispherical cavity, and a core consisting of the inner core and an outer core was formed by a first crosslinking process and a second crosslinking process. In the first crosslinking process, the crosslinking temperature was 140° C., and the crosslinking time period was 20 minutes. In the second crosslinking process, the crosslinking temperature was 160° C., and the crosslinking time period was 10 minutes. The diameter of the core was 38.5 mm.

A resin composition (M2) was obtained by kneading 50 parts by weight of an ionomer resin (the aforementioned "Surlyn 8150"), 50 parts by weight of another ionomer resin (the aforementioned "Himilan AM7329"), and 4 parts by weight of titanium dioxide with a twin-screw kneading extruder. The core was covered with this resin composition (M2) by injection molding to form a mid layer with a thickness of 1.6 mm.

A paint composition (trade name "POLIN 750LE", manufactured by SHINTO PAINT CO., LTD.) including a two-component curing type epoxy resin as a base polymer was prepared. The base material liquid of this paint composition includes 30 parts by weight of a bisphenol A type epoxy resin and 70 parts by weight of a solvent. The curing agent liquid of this paint composition includes 40 parts by weight of a modified polyamide amine, 55 parts by weight of a solvent, and 5 parts by weight of titanium dioxide. The weight ratio of the base material liquid to the curing agent liquid is 1/1. This paint composition was applied to the surface of the mid layer with a spray gun, and kept at 23° C. for 12 hours to obtain a reinforcing layer with a thickness of 10 μm.

A resin composition (C2) was obtained by kneading 100 parts by weight of a thermoplastic polyurethane elastomer (the aforementioned "Elastollan NY86A"), 5 parts by weight of a polyrotaxane (the aforementioned "SeRM Super Polymer SH2400P"), 0.2 parts by weight of a light stabilizer (trade name "TINUVIN 770"), 4 parts by weight of titanium dioxide, and 0.04 parts by weight of ultramarine blue with a twin-screw kneading extruder. Half shells were obtained from this resin composition (C2) by compression molding. The sphere consisting of the inner core, the outer core, the mid layer, and the reinforcing layer was covered with two of the half shells. These half shells and the sphere were placed into a final mold that includes upper and lower mold halves each having a hemispherical cavity and has a large number of pimples on its cavity face, and a cover was obtained by compression molding. The thickness of the cover was 0.5 mm. Dimples having a shape that is the inverted shape of the pimples were formed on the cover. In the polyrotaxane, at least a part of the hydroxyl groups of the cyclodextrin is modified with a caprolactone chain via a —O—$C_3H_6$—O— group. In the polyrotaxane, the linear molecule is polyethylene glycol, and the molecular weight of the linear molecule is 20,000. In the polyrotaxane, the blocking group is an adamantyl group, the hydroxyl value is 76 mg KOH/g, and the weight average molecular weight is 400,000.

A clear paint including a two-component curing type polyurethane as a base material was applied to this cover to obtain a golf ball of Example 1 with a diameter of about 42.7 mm and a weight of about 45.6 g.

Examples 2 to 8 and Comparative Examples 1 to 7

Golf balls of Examples 2 to 8 and Comparative Examples 1 to 7 were obtained in the same manner as Example 1, except the specifications of the inner core, the outer core, the mid layer, and the cover were as shown in Tables 5 to 7 below. The specifications of the inner core and the outer core are shown in detail in Tables 1 and 2 below. The specifications of the mid layer are shown in detail in Table 3 below. The specifications of the cover are shown in detail in Table 4 below.

[Flight Test]

A driver (trade name "Z745", manufactured by DUNLOP SPORTS CO. LTD., shaft hardness: S, loft angle: 8.5°) was attached to a swing machine manufactured by Golf Laboratories, Inc. A golf ball was hit under a condition of a head speed of 50 m/sec, and the initial speed, the spin rate, and the flight distance of the golf ball were measured. The flight distance is the distance between the point at the hit and the point at which the ball stopped. The average value of data obtained by 12 measurements is shown in Tables 5 to 7 below.

[Controllability]

A wedge (trade name "RTX588BLD", manufactured by Cleveland Golf Company, Inc., loft angle: 58°) was attached to a swing machine manufactured by Golf Laboratories, Inc. The face of the golf club and a golf ball were wetted with water, the golf ball was hit under a condition of a head speed of 21 m/sec, and a spin rate was measured. The average value of data obtained by 12 measurements was calculated. The difference between the average of each golf ball and the average of the golf ball according to Example 1 is shown in Tables 5 to 7 below.

TABLE 1

| Composition of Core (parts by weight) | | | | |
|---|---|---|---|---|
|  | a | b | c | d |
| Polybutadiene | 100 | 100 | 100 | 100 |
| Zinc diacrylate | — | 26.0 | 31.5 | 41.5 |
| Magnesium oxide | 35 | — | — | — |
| Methacrylic acid | 28 | — | — | — |
| Zinc oxide | — | 5 | 5 | 5 |
| Barium sulfate | — | * | * | * |
| H-BHT | — | — | — | 0.1 |
| 2-naphthalenethiol | — | — | 0.2 | — |
| Diphenyl disulfide | — | 0.5 | — | 0.5 |
| Bis(pentabromophenyl) disulfide | — | — | 0.3 | — |
| Dicumyl peroxide | 0.9 | 0.7 | 0.8 | 0.7 |

* Appropriate amount

TABLE 2

| Specifications of Core | | | | | |
|---|---|---|---|---|---|
|  |  | I | II | III | IV |
| Inner layer | Composition | a | b | b | b |
|  | Cross. Temp.(° C.) | 170 | 170 | 170 | 170 |
|  | Cross. Time(min) | 20 | 15 | 15 | 15 |
|  | Diameter D1(mm) | 15 | 24 | 27 | 20 |
| Outer layer | Composition | c | d | d | d |
|  | First Cross. Temp.(° C.) | 150 | 140 | 140 | 140 |

TABLE 2-continued

Specifications of Core

|  | I | II | III | IV |
|---|---|---|---|---|
| First Cross. Time(min) | 20 | 20 | 20 | 20 |
| Second Cross. Temp.(° C.) | — | 160 | 160 | 160 |
| Second Cross. Time(min) | — | 10 | 10 | 10 |

TABLE 3

Specifications of Mid Layer (parts by weight)

|  | M1 | M2 | M3 | M4 |
|---|---|---|---|---|
| Surlyn 8150 | — | 50 | 25 | 32.5 |
| Surlyn 9150 | — | — | — | 32.5 |
| Polyamide 6 | — | — | — | 35 |
| Himilan 1605 | 47 | — | 25 | — |
| Himilan AM7329 | 50 | 50 | 50 | — |
| RABALON T3221C | 3 | — | — | — |
| Titanium dioxide | 4 | 4 | 4 | 4 |
| Hm (Shore D) | 63 | 68 | 66 | 72 |

TABLE 4

Specifications of Cover (parts by weight)

|  | C1 | C2 | C3 | C4 |
|---|---|---|---|---|
| Elastollan NY84A | 100 | — | 100 | — |
| Elastollan NY86A | — | 100 | — | — |
| Elastollan NY92A | — | — | — | 100 |
| Polyrotaxane | 5 | 5 | — | 5 |
| TINUVIN 770 | 0.2 | 0.2 | 0.2 | 0.2 |
| Titanium dioxide | 4 | 4 | 4 | 4 |
| Ultramarine blue | 0.04 | 0.04 | 0.04 | 0.04 |
| Hc (Shore D) | 29 | 31 | 31 | 38 |

TABLE 5

Results of Evaluation

|  | Ex. 1 | Ex. 2 | Comp. Ex. 1 | Ex. 3 | Ex. 4 |
|---|---|---|---|---|---|
| Core | II | II | II | III | IV |
| Inner core |  |  |  |  |  |
| D1 (mm) | 24 | 24 | 24 | 27 | 20 |
| V1 (mm³) | 7238 | 7238 | 7238 | 10306 | 4189 |
| H1o (Shore C) | 60 | 60 | 60 | 60 | 60 |
| H1in (Shore C) | 74 | 74 | 74 | 74 | 74 |
| Outer core |  |  |  |  |  |
| D2 (mm) | 38.5 | 39.1 | 38.1 | 38.5 | 38.5 |
| V2 (mm³) | 22642 | 24061 | 21720 | 19574 | 25691 |
| H2out (Shore C) | 82 | 82 | 82 | 82 | 82 |
| H2s (Shore C) | 82 | 82 | 82 | 82 | 82 |
| H2s − H2out | 0 | 0 | 0 | 0 | 0 |
| Mid layer |  |  |  |  |  |
| Composition | M2 | M2 | M2 | M2 | M2 |
| Hm (Shore D) | 68 | 68 | 68 | 68 | 68 |
| Tm (mm) | 1.6 | 1.3 | 1.8 | 1.6 | 1.6 |
| Cover |  |  |  |  |  |
| Composition | C2 | C2 | C2 | C2 | C2 |
| Hc (Shore D) | 31 | 31 | 31 | 31 | 31 |
| Tc (mm) | 0.5 | 0.5 | 0.5 | 0.5 | 0.5 |
| V2/V1 | 3.1 | 3.3 | 3.0 | 1.9 | 6.1 |
| Value Va | 804 | 804 | 804 | 905 | 670 |
| Value Vb | 659 | 811 | 586 | 659 | 659 |
| Sb (mm) | 2.3 | 2.4 | 2.3 | 2.3 | 2.3 |
| W#1 speed (m/s) | 73.7 | 73.5 | 73.7 | 73.6 | 73.7 |
| W#1 spin(rpm) | 2500 | 2400 | 2650 | 2500 | 2550 |
| W#1 distance (yd) | 289.0 | 289.0 | 287.5 | 288.5 | 288.5 |
| Wet spin (rpm) | 0 | 0 | 0 | 0 | 0 |

TABLE 6

Results of Evaluation

|  | Ex. 5 | Ex. 6 | Ex. 7 | Comp. Ex. 2 | Ex. 8 |
|---|---|---|---|---|---|
| Core | II | II | II | II | II |
| Inner core |  |  |  |  |  |
| D1 (mm) | 24 | 24 | 24 | 24 | 24 |
| V1 (mm³) | 7238 | 7238 | 7238 | 7238 | 7238 |
| H1o (Shore C) | 60 | 60 | 60 | 60 | 60 |
| H1in (Shore C) | 74 | 74 | 74 | 74 | 74 |
| Outer core |  |  |  |  |  |
| D2 (mm) | 38.5 | 38.5 | 38.5 | 38.5 | 38.3 |
| V2 (mm³) | 22642 | 22642 | 22642 | 22642 | 22179 |
| H2out (Shore C) | 82 | 82 | 82 | 82 | 82 |
| H2s (Shore C) | 82 | 82 | 82 | 82 | 82 |
| H2s − H2out | 0 | 0 | 0 | 0 | 0 |
| Mid layer |  |  |  |  |  |
| Composition | M3 | M4 | M2 | M2 | M2 |
| Hm (Shore D) | 66 | 72 | 68 | 68 | 68 |
| Tm (mm) | 1.6 | 1.6 | 1.6 | 1.6 | 1.6 |
| Cover |  |  |  |  |  |
| Composition | C2 | C2 | C4 | C1 | C2 |
| Hc (Shore D) | 31 | 31 | 38 | 29 | 31 |
| Tc (mm) | 0.5 | 0.5 | 0.5 | 0.5 | 0.6 |
| V2/V1 | 3.1 | 3.1 | 3.1 | 3.1 | 3.1 |
| Value Va | 804 | 804 | 804 | 804 | 804 |
| Value Vb | 639 | 698 | 808 | 616 | 791 |
| Sb (mm) | 2.3 | 2.2 | 2.3 | 2.3 | 2.3 |
| W#1 speed (m/s) | 73.7 | 73.7 | 73.7 | 73.5 | 73.7 |
| W#1 spin(rpm) | 2550 | 2450 | 2350 | 2550 | 2600 |
| W#1 distance (yd) | 288.5 | 289.5 | 290.5 | 287.5 | 288.0 |
| Wet spin (rpm) | 0 | −50 | −200 | −200 | 0 |

TABLE 7

Results of Evaluation

|  | Comp. Ex. 3 | Comp. Ex. 4 | Comp. Ex. 5 | Comp. Ex. 6 | Comp. Ex. 7 |
|---|---|---|---|---|---|
| Core | II | II | II | II | I |
| Inner core |  |  |  |  |  |
| D1 (mm) | 24 | 24 | 24 | 24 | 15 |
| V1 (mm³) | 7238 | 7238 | 7238 | 7238 | 1767 |
| H1o (Shore C) | 60 | 60 | 60 | 60 | 62 |
| H1in (Shore C) | 74 | 74 | 74 | 74 | 65 |
| Outer core |  |  |  |  |  |
| D2 (mm) | 38.9 | 38.5 | 39.7 | 38.5 | 39.7 |
| V2 (mm³) | 23583 | 22642 | 25524 | 22642 | 30995 |
| H2out (Shore C) | 82 | 82 | 82 | 82 | 71 |
| H2s (Shore C) | 82 | 82 | 82 | 82 | 85 |
| H2s − H2out | 0 | 0 | 0 | 0 | 14 |

TABLE 7-continued

Results of Evaluation

|  | Comp. Ex. 3 | Comp. Ex. 4 | Comp. Ex. 5 | Comp. Ex. 6 | Comp. Ex. 7 |
|---|---|---|---|---|---|
| Mid layer |  |  |  |  |  |
| Composition | M2 | M2 | M2 | M1 | M2 |
| Hm (Shore D) | 68 | 68 | 68 | 63 | 68 |
| Tm (mm) | 1.6 | 1.6 | 1.0 | 1.6 | 1.0 |
| Cover |  |  |  |  |  |
| Composition | C2 | C3 | C2 | C2 | C1 |
| Hc (Shore D) | 31 | 31 | 31 | 31 | 29 |
| Tc (mm) | 0.3 | 0.5 | 0.5 | 0.5 | 0.5 |
| V2/V1 | 3.3 | 3.1 | 3.5 | 3.1 | 17.5 |
| Value Va | 804 | 804 | 804 | 804 | 476 |
| Value Vb | 395 | 659 | 1054 | 610 | 986 |
| Sb (mm) | 2.3 | 2.3 | 2.5 | 2.4 | 2.3 |
| W#1 speed (m/s) | 73.7 | 73.7 | 73.2 | 73.3 | 73.4 |
| W#1 spin (rpm) | 2400 | 2500 | 2400 | 2550 | 2500 |
| W#1 distance (yd) | 290.0 | 289.0 | 287.5 | 286.5 | 287.5 |
| Wet spin (rpm) | −700 | −500 | 0 | 50 | −200 |

As shown in Tables 5 to 7, the golf ball of each Example has excellent flight performance upon a shot with a driver. Furthermore, the golf ball of each Example has excellent controllability in a wet state. From the results of evaluation, advantages of the present invention are clear.

The golf ball according to the present invention is suitable for, for example, playing golf on golf courses and practicing at driving ranges. The above descriptions are merely illustrative examples, and various modifications can be made without departing from the principles of the present invention.

What is claimed is:

1. A golf ball comprising:
a core consisting of an inner core and an outer core positioned outside the inner core, wherein the inner core has a diameter D1 of equal to or greater than 18.0 mm but equal to or less than 32.0 mm,
the inner core with a diameter D1 (mm), a hardness H1o (Shore C) at a central point, and a boundary inside hardness H1in (Shore C) of the inner core (i) having a difference (H1in−H1o) equal to or greater than 10 but equal to or less than 40 and (ii) meeting the following mathematical formula (3): $600 < (H1o + H1in) * (D1/2)/2 < 1000$ (3), said boundary inside hardness H1in being a hardness of a point separated 1 mm radially inward from a boundary between the inner core and the outer core at a cross-section of the golf ball cut into two halves,
a mid layer positioned outside the outer core with a hardness Hm (Shore D) equal to or greater than 66, and
a cover positioned outside the mid layer,
said cover comprising a resin composition including:
(A) a polyurethane; and
(B) a polyrotaxane having a cyclodextrin, a linear molecule that is threaded through a ring structure of the cyclodextrin, and a blocking group that is located at each of both ends of the linear molecule and prevents detachment of the cyclodextrin, at least a part of hydroxyl groups of the cyclodextrin being modified with a caprolactone chain via a $-O-C_3H_6-O-$ group.

2. The golf ball according to claim 1, wherein
a volume V1 ($mm^3$) of the inner core and a volume V2 ($mm^3$) of the outer core meet the following mathematical formula (1), $$1.0 < V2/V1 < 7.0 \quad (1)$$

3. The golf ball according to claim 1, wherein
a boundary outside hardness H2out (Shore C), said boundary outside hardness H2out being a hardness of a point separated 1 mm radially outward from a boundary between the inner core and the outer core at a cross-section of the golf ball cut into two halves, and a surface hardness H2s (Shore C) of the outer core meet the following mathematical formula (2):

$$-2 < H2s - H2out < 2 \quad (2).$$

4. The golf ball according to claim 1, wherein
a thickness Tm (mm) and a hardness Hm (Shore D) of the mid layer; and a thickness Tc (mm) and a hardness Hc (Shore D) of the cover meet the following mathematical formula (4), $$620 < Tc * Hc * Hm/Tm < 900 \quad (4)$$

5. The golf ball according to claim 1, wherein the linear molecule is polyethylene glycol, and the blocking group is an adamantyl group.

6. The golf ball according to claim 1, wherein an amount of the polyrotaxane (B) in the resin composition of the cover per 100 parts by weight of the polyurethane (A) is equal to or greater than 1 parts by weight but equal to or less than 50 parts by weight.

7. The golf ball according to claim 1, wherein a loss elastic modulus E" of the polyurethane (A) is equal to or less than $5.0*10^7$ Pa.

8. The golf ball according to claim 1, wherein a loss elastic modulus E" of the cover is equal to or less than $5.0*10^7$ Pa.

9. The golf ball according to claim 1, wherein the outer core is formed by crosslinking a rubber composition.

10. The golf ball according to claim 1, wherein a hydroxyl value of the polyrotaxane (B) is equal to or greater than 10 mg KOH/g but equal to or less than 400 mg KOH/g.

11. The golf ball according to claim 1, wherein a degree of polymerization of the caprolactone chain is 1 to 100.

* * * * *